United States Patent [19]

Chandler

[11] 4,083,439

[45] Apr. 11, 1978

[54] POWER COLLECTION DEVICE FOR ELECTRIC POWERED RAIL CARS

[76] Inventor: Leo E. Chandler, 3285 Mission Ridge La., Atlanta, Ga. 30339

[21] Appl. No.: 613,969

[22] Filed: Sep. 16, 1975

[51] Int. Cl.² .............................................. B60M 1/04
[52] U.S. Cl. ........................................ 191/31; 191/35; 191/48; 339/21 S
[58] Field of Search ........ 191/22 C, 2, 29 R, 29 DM, 191/25, 30, 31, 35, 59.1, 48, 49; 339/21 S, 22 T, 6 R

[56] References Cited

U.S. PATENT DOCUMENTS 1,010,504  12/1911  Lindsley ................................ 191/31

FOREIGN PATENT DOCUMENTS 925,300  3/1955  Germany ................................ 191/35
398,602  9/1933  United Kingdom ................... 191/31

Primary Examiner—Trygve M. Blix
Assistant Examiner—Reinhard J. Eisenzopf
Attorney, Agent, or Firm—Watson, Cole, Grindle & Watson

[57] ABSTRACT

A power distribution system for rail vehicles comprising a flexible resilient conduit for protecting a first electrical conductor fixed in a crowned resilient encasing slotted to receive a second electrical conductor which surrounds the flexible conduit and a second electrical conductor having first lubricating and conducting inserts for improving the electrical contact between the first and second conductors and reducing the friction between the two conductors and second non-conductive lubricating inserts for reducing friction between the second conductor and the resilient encasing.

5 Claims, 4 Drawing Figures

POWER COLLECTION DEVICE FOR ELECTRIC POWERED RAIL CARS

BACKGROUND OF THE INVENTION

Historically in the United States, metropolitan mass transit systems have depended to a great extent upon free wheel transport devices such as busses to carry the main passenger loads because of the great expense inherent in the construction of rail systems of the subway type. At one time fixed wheel tram or trolley cars were used which were electrically powered using overhead power collection devices. In the recent past an increasing emphasis has been placed upon environment and the appearance of the skylines in most metropolitan areas and because of this many overhead systems have been dismantled and replaced with busses. Now, with the increasing interest in "clean air" and the reduction of air pollutants found in metropolitan areas by reducing the allowable amount of combustion products which may be emitted from the internal combustion engine the interest in efficient electrically powered mass transit vehicles has begun to grow. Coupled with this renewed interest has been the interest in electrical powered mass transit systems which has been created by the current shortages of petroleum products.

In the past, underground power collection systems for street railways have been of the plow conduit type. In the plow conduit type power collection system a "plow", the electrical contact device carried by a railway car, is inserted into a conduit which is buried in the street, where it makes contact with a second electrical conductor whereby electrical energy is transmitted to the driving mechanism of the rail car. Prior art plows have either been of a rolling or sliding type and consequently speeds attainable by the mass transit car were low because of friction and other mechanical factors inherent in the design of a plow-conduit type of power collection system.

Generally the prior art conduit is embedded in the street and anchored to a concrete base with anchor bolts and is generally covered by a rigid slotted resilient plate which in some cases had a flexible sealing material positioned within the slot to impede the entry of dirt and mositure into the rail area and to reduce the danger of electrical shock to pedestrians and passengers of free wheel vehicles. Because of its construction it has been necessary to locate special pits along the course of the prior art conduit to allow for the insertion and removal of the plow from the conduit and to provide means for reversing the direction of the car. Further, special tools have generally been required to maintain the prior art conduit. Generally, prior art conduit has been subject to electrical failures because of moisture, dirt and foreign objects which penetrate into the conduit through the plow slot and despite precautions taken the prior art conduit is inherently dangerous to pedestrians because of the structure of the plow slot and the resilient cover plate.

Despite the many advantages of the steel covered conduit system major problems with their use are:

1. Systems using steel or metal cased power collections are limited to a relatively lower safe operating speed;
2. The rubber plow slot covers rapidly deteriorate because of heat generated by the rapid passage of the plow through the rubber casing; and,
3. The plow slot opening allows water, snow, dirt and foreign objects to penetrate into the area of the conductor thereby causing electrical failure and danger to pedestrians and passengers.

SUMMARY OF THE INVENTION

In view of the foregoing, it should be apparent that there is still a need in the art for an effective means, having efficiency and permanence, for collecting and distributing electrical power to electrically powered rail vehicles. Accordingly, there has been provided in accordance with this invention a novel means for collecting and distributing electrical power to rail vehicles.

It is therefore an object of the present invention to provide a rail power collection system which is less costly to install and maintain but superior to present power collection systems in performance.

It is a further object of the present invention to provide a rail power collection system which is quieter during operation than are such systems based on prior art designs.

It is another object of the present invention to provide a light-rail power collection system which cannot be shortcircuited by ice, snow, sand or metallic objects.

Still another object of the present invention is to provide a rail power collection system having higher power contact efficiency.

These and other objects of the present invention are accomplished by an improved plow-conduit system which, in its broadest aspects comprises in combination a flexible and resilient conduit buried in the pavement of a street and anchored thereto by anchoring means, wherein said buried conduit is encased in a slotted flexible resilient material having a durometer hardness of from about 55 to about 60; and slotted rubber material being slotted to receive the plow of a passing rail car; and rail power collection and distribution device mounted in said resilient flexible conduit and a semi conductive lubricating means affixed to the contact suface of the plow and non-conductive lubricating means affixed to either side of the plow shaft at a point which exactly contacts the lips of the plow receiving slot of the flexible conduit whereby the plow is allowed swift and quiet passage through the encasing material and is contemporaneously held in conductive contact with the rail.

Having in mind the above and other objects that will become evident from a reading of this disclosure, the present invention comprises the combinations and arrangements of parts illustrated in the presently preferred embodiment of the invention which are hereinafter set forth in sufficient detail to enable those persons of ordinary skill in the art to clearly understand the function, operation, construction and advantages of the instant invention when read in conjunction with the accompanying drawings.

DESCRIPTION OF THE PREFERRED EMBODIMENT

For purposes of illustration, the invention disclosed herein will be described in terms of one embodiment thereof, it being understood that the successful practice of the present invention is not limited to the particular embodiment used to describe the preferred embodiment but in fact the invention can be successfully practiced using several embodiments without departing from the spirit and scope of the invention herein disclosed.

Figure 1:
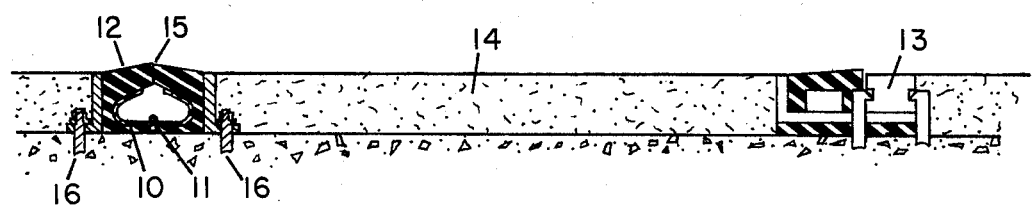
FIG. 1 is a general cross sectional representation of flexible conduit power collection system for rail cars in a buried or trenched installation.

Referring now in more detail to the drawings, in which like numerals indicate like parts throughout the several views herein discussed and described. The device will now be described in reference to FIG. 1 which depicts generally in cross-section buried installation of a flexible conduit and rail installation wherein track 13 is spaced away from conduit 10. Conduit 10 having rail 11 affixed therein is surrounded by rubber casing 12. Rubber casing 12 is equipped with plow receiving slot 15 whereby a plow (not shown) may be inserted into conduit 10 and contact rail 11. Conduit 10 is anchored into pavement 14 by anchors 16.

Figure 2:
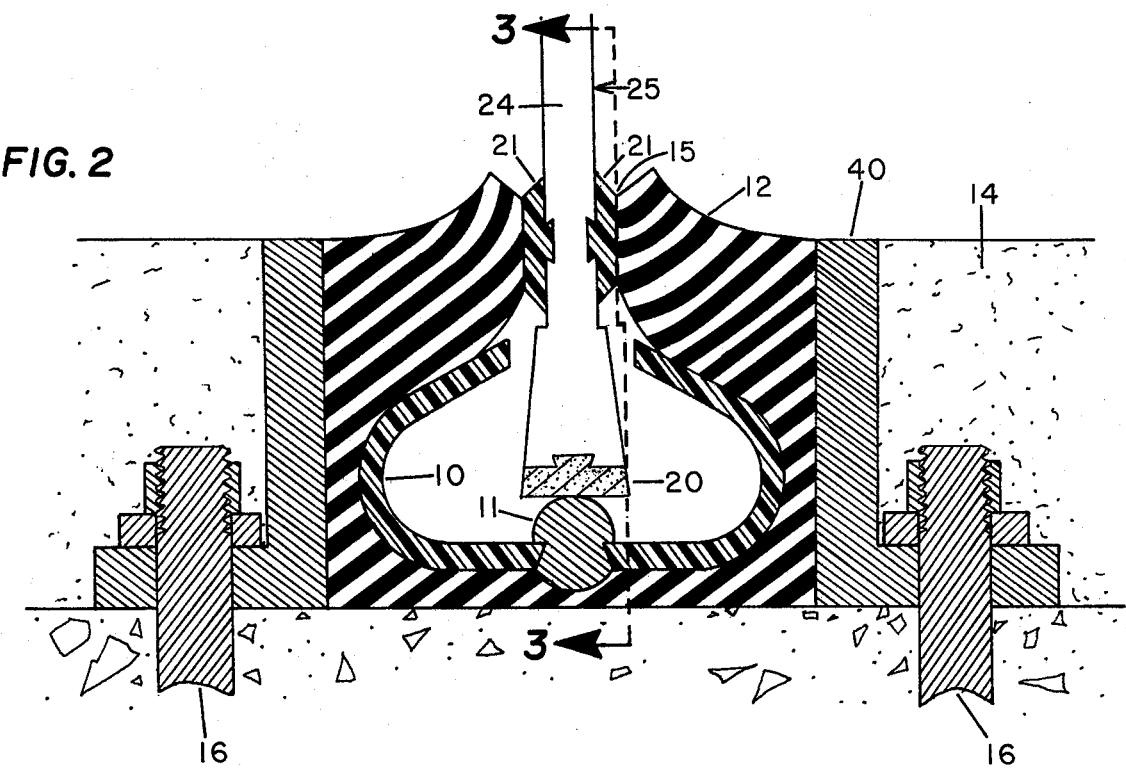
FIG. 2 is a cross sectional representation of a plowconduit power collection system constructed according to the present invention.

Turning now to FIG. 2 and a more detailed discussion of a conduit embodying the present invention, conduit 10 has mounted therein rail 11. Conduit 10 is encased in a flexible resilient casing 12 and the entire assembly affixed to pavement 14 by anchors 16. Flexible resilient casing 12 and conduit 10 may be fabricated from materials such as vulcanized rubber, silicone rubber, air vulcanized rubber and like materials. Plow 25 projects through plow receiving slot 15 and slidingly contacts rail 11. Plow 25 is constructed in such a manner that semiconductive and lubricating insert 20 which is fixedly mounted to the base of the plow 25 contacts rail 11 and eases the progress of plow 25 along rail 11 because of its lubricating qualities and because of its conductive nature promotes a better electrical connection between rail 11 and plow 25. Mounted upon the shaft 24 of plow 25 are lubricating non-conductive inserts 21. Inserts 21 are so positioned upon shaft 24 that they are in sliding contact with flexible resilient casing 12 in and along the boundaries of plow receiving slot 15. Inserts 21 consist of a highly self lubricating material whereby as the plow progresses along rail 11 and contemporaneously through slot 15 friction is less than the friction which could be expected with prior art plows: Inserts 21 may be successfully fabricated with materials such as nylon and teflon. As a result of the reduced friction the heat buildup normally experienced as plow 25 moves through slot 15 is less than the heat buildup experienced when a plow not embodying the present invention would move through slot 15 thereby causing the flexible resilient casing to endure the rigors of operation for extended periods of time. Also, inserts 21 because of their lubricating qualities abrade rubber 12 less as plow 25 moves through slot 15 and consequently casing 12 does not require replacement as frequently as would rubber slot seals used with prior art plows. Further, plow 25 of the present invention is so constructed that inserts 21 wear away and may be replaced thereby increasing the functional life of plow 25.

Figure 3:
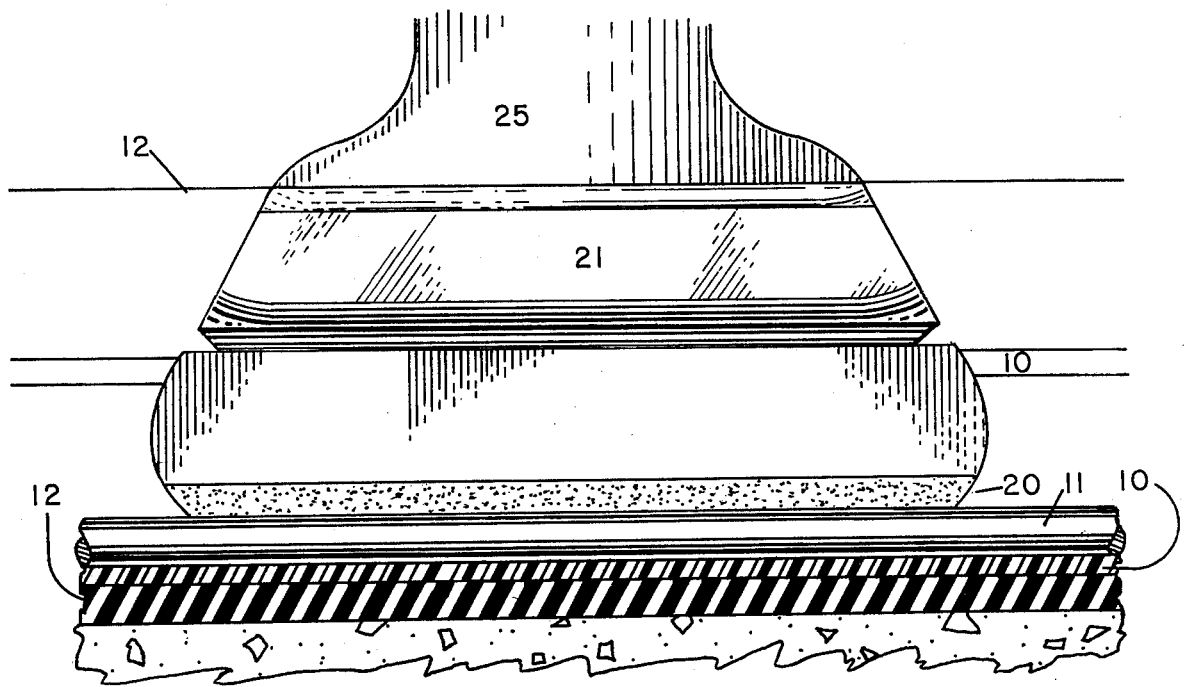
FIG. 3 is a side cross sectional view of a plow designed to practice the present invention.

Referring now to FIG. 3, a partial cross section taken along line 3—3 wherein plow 25 is shown in side elevation. Inserts 21 are shown in their relative position to casing 12 as condutive insert 20 contacts rail 11. It is readily seen from FIG. 3 that inserts 21 project slightly above street level thereby prohibiting any contact between the metal of plow shaft 24 and rubber 12.

Figure 4:
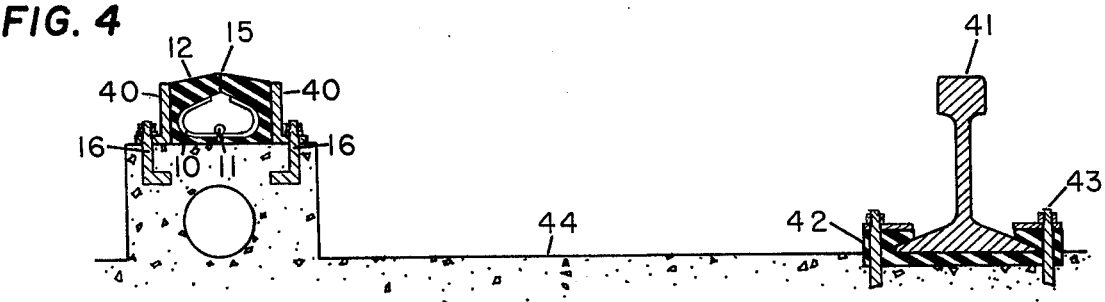
FIG. 4 is a cross sectional representation of a flexible conduit power collection system for rail cars in a non-buried or open installation.

FIG. 4 generally represents a non-buried or open type installation of a conduit 10 for providing electrical power to a rail car. In this type installation conduit 10 surrounded by casing 12 is firmly fixed between flanges 40 which are mounted upon the surface of a street 44 by anchors 16. Rail 41 is also anchored to the surface of street 44 by anchors 42 and 43.

The invention has been described in conjunction with two configurations of one particular embodiment and it is to be understood that obvious modifications and changes may be made without departing from the spirit and scope of the invention as defined in the appended claims and the invention is intended to cover all such modifications and changes which fall within the scope of the claimed invention.

What is claimed is:

1. A power distribution system embedded in pavement for electrically powered vehicles comprising:
    a flexible resilient conduit having an opening and including a first electrical conductor partially mounted therein opposite said opening;
    a flexible resilient casing partially surrounding said resilient conduit and including flexible lip members adapted to be in abutting relation along two opposing first surfaces and to be separated with opposing second surfaces forming an opening in aligned relationship with the opening in said flexible resilient conduit;
    a movable second electrical conductor for conducting power to said rail vehicles separating said lip members and extending through said aligned openings, said second power conductor including a first lubricating conductive insert at the end thereof in contact with said first electrical conductor; said second power conductor including second lubricating non-conductive inserts rigidly but removably attached to said second conductor with said inserts engaging said opposing second surfaces of said lip members, said first surfaces being angled with respect to said lip members to form a seal over the opening in said flexible resilient conduit, whereby external pressure on said lip members causes said opposing second surfaces to be in tighter abutting relationship.

2. A power distribution system as in claim 1 wherein said first electrical conductor is partially embedded in said flexible resilient casing.

3. A power distribution system as in claim 1 wherein said second inserts include opposing surfaces respectively engaging said second surfaces in substantially parallel relationship.

4. A power distribution system as in claim 1 wherein the mass of said flexible resilient casing is substantially greater above the opening in said flexible resilient conduit than in the other regions surrounding said flexible conduit.

5. A power distribution system as in claim 4 further comprising flange members extending in abutting-supporting relationship to said flexible resilient casing along the longitudinal axis thereof.

* * * * *